United States Patent
Bauman (10) Patent No.: US 7,171,244 B2
(45) Date of Patent: Jan. 30, 2007

(54) COMMUNICATION SYSTEM AND METHOD WITH GAIN CONTROL FOR SIGNALS FROM DISTRIBUTED ANTENNAS

(75) Inventor: Donald R. Bauman, Waseca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 213 days.

(21) Appl. No.: 10/308,854

(22) Filed: Dec. 3, 2002

(65) Prior Publication Data
US 2004/0203339 A1   Oct. 14, 2004

(51) Int. Cl.
  H04B 7/00    (2006.01)
  H04M 1/00    (2006.01)
  H04Q 7/20    (2006.01)
(52) U.S. Cl. .............. 455/566; 455/561; 455/525; 455/426.1
(58) Field of Classification Search ........... 455/562.1, 455/453, 561, 3.03, 452, 426.2, 101, 550.1, 455/403, 103, 524, 525, 422, 426, 523, 426.1, 455/249.1, 250.1; 379/260.01
See application file for complete search history.

(56) References Cited

U.S. PATENT DOCUMENTS

| | | | |
|---|---|---|---|
| 4,144,411 A | 3/1979 | Frenkiel | |
| 4,451,699 A | 5/1984 | Gruenberg | |
| 4,475,010 A | 10/1984 | Huensch et al. | |
| 4,485,486 A | 11/1984 | Webb et al. | |
| 4,556,760 A | 12/1985 | Goldman | |
| 4,849,963 A | 7/1989 | Kawano et al. | |
| 4,916,460 A * | 4/1990 | Powell | 343/853 |
| 5,067,173 A | 11/1991 | Gordon et al. | |
| 5,278,690 A | 1/1994 | Vella-Coleiro | |
| 5,621,786 A | 4/1997 | Fischer et al. | |
| 5,627,879 A | 5/1997 | Russell et al. | |
| 5,642,405 A | 6/1997 | Fischer et al. | |
| 5,644,622 A | 7/1997 | Russell et al. | |
| 5,657,374 A | 8/1997 | Russell et al. | |
| 5,765,099 A | 6/1998 | Georges et al. | |
| 5,774,789 A | 6/1998 | van der Kaay et al. | |
| 5,802,173 A * | 9/1998 | Hamilton-Piercy et al. | 379/56.2 |
| 5,809,395 A | 9/1998 | Hamilton-Piercy et al. | |

(Continued)

FOREIGN PATENT DOCUMENTS

EP    0346925 A2    12/1989

(Continued)

OTHER PUBLICATIONS

"And now a few words from your Customers . . . " Four pages. ADC Kentrox. COPYRGT. A Subsidiary of ADC Telecommunications, Inc. Aug. 1992.

(Continued)

*Primary Examiner*—Tilahun Gesesse
(74) *Attorney, Agent, or Firm*—Fogg & Associates, LLC; David N. Fogg (57) ABSTRACT

A distributed antenna system is configured in a daisy-chain fashion along a single path. The summation of the signals received by each antenna port of the system is distributed along the path. The signal gain for the system is controlled by distributed attenuation and distributed gain control by using attenuators at port inputs, port outputs, or both.

45 Claims, 9 Drawing Sheets

U.S. PATENT DOCUMENTS

| | | | |
|---|---|---|---|
| 5,852,651 | A | 12/1998 | Fischer et al. |
| 5,878,325 | A * | 3/1999 | Dail .......................... 725/125 |
| 5,969,837 | A | 10/1999 | Farber et al. |
| 612,086 | A | 8/2000 | Wais |
| 6,122,529 | A * | 9/2000 | Sabat et al. ................. 455/561 |
| 6,150,993 | A * | 11/2000 | Dobrovolny ................ 343/853 |
| 6,223,021 | B1 | 4/2001 | Silvia et al. |
| 6,259,910 | B1 * | 7/2001 | Fairfield et al. ......... 455/422.1 |
| 6,298,246 | B1 * | 10/2001 | Lysejko et al. ............. 455/557 |
| 6,336,042 | B1 * | 1/2002 | Dawson et al. .......... 455/562.1 |
| 6,349,200 | B1 | 2/2002 | Sabat, Jr. et al. |
| 6,374,124 | B1 * | 4/2002 | Slabinski ................. 455/562.1 |
| 6,480,702 | B1 * | 11/2002 | Sabat, Jr. ................. 455/115.3 |
| 6,801,767 | B1 * | 10/2004 | Schwartz et al. ........ 455/426.2 |
| 6,807,374 | B1 * | 10/2004 | Imajo et al. ................ 398/115 |
| 2003/0143947 | A1 | 7/2003 | Lyu |
| 2003/0162516 | A1 | 8/2003 | Solum |

FOREIGN PATENT DOCUMENTS

| | | |
|---|---|---|
| EP | 0368673 A1 | 5/1990 |
| EP | 0468688 A2 | 1/1992 |
| FR | 2345865 | 10/1977 |

OTHER PUBLICATIONS

ADC Kentrox, News Release, "ADC Kentrox Introduces Innovative Wireless Network Access Solution Cellular Subscribers Offered a New Level of Portable Services," Mar. 1, 1993 (3 pages).

ADC Kentrox, News Release, "First Field Trial Results Exceeds Expectations," Mar. 2, 1993 (2 pages).

ADC Kentrox Wireless System Group CityCell.TM. 824-A Positioning white paper, (Mar. 1993) CITA Trade Show.

"ADC Kentrox Introduces CityCell 824, A Replacement For Conventional Cell Sites; Company's Original Goal Was To Improve Fiber Optic T1 Links Between Cells, MTSOs," Telocator Bulletin, Feb. 1993 (1 page).

Akos et al., Jul. 1999, IEEE Transactions on Communications, 47: 983-988, "Direct Bandpass Sampling of Multiple Distinct RF Signals".

1998 Foxcom Wireless Proprietary Information, pp. 1-8, "Litenna In-Building RF Distribution System".

Kobb, "Personal Wireless," Special Report/Communications, IEEE Spectrum, Jun. 1993, pp. 20-25.

Lee et al., 1993 43rd IEEE Vehicular Technology Conference, May 18-20, 1993, Personal Communications-Freedom Through Wireless Technology, PacTel Corporation, published May 18, 1993, "Intelligent Microcell Applications in PCS," pp. 722-725.

Merrett et al., 41st IEEE Vehicular Technology Conference, May 19-22, 1991, Gateway to the Future Technology, 91CH2944-7, British Telecom Research Laboratories, "A Cordless Access System Using Radio-Over-Fibre Techniques," pp. 921-924.

Microwaves & RF, "Digital Transport for Cellular," Feb. 1993.

Russell, New Microcell Technology Sets Cellular Carriers Free, Telephony, Mar. 1993, pp. 40, 42 and 46.

R. Steele. Towards a High-Capacity Digital Cellular Mobile Radio System. "Towards a High Capacity Digital Cellular Mobile Radio System," IEE Proceedings, vol. 132, Pt.F, No. 5, Aug. 1985, pp. 405-415.

Tang, Fiber Optic Antenna Remoting for Multi-Sector Cellular Cell Sites. GTE Laboratories-Abstract (Conference Jun. 14-18, 1992).

Urban Microcell System Layout. GTE Laboratories (Conference Jun. 14-18, 1992).

Wala, 1993 43rd IEEE Vehicular Technology Conference, May 18-20, 1993, Personal Communication-Freedom Through Wireles Technology, Waseca Technology Inc., published May 18, 1993, "A New Microcell Architecture Using Digital Optical Transport,", pp. 585-588.

"ZoneMaster.TM.-Maximum Coverage for High-Capacity Locations". Decibel Multi Media MicroCELL System. 4 pages. 1993 Decibel Products. 2-83-5M.

* cited by examiner

COMMUNICATION SYSTEM AND METHOD WITH GAIN CONTROL FOR SIGNALS FROM DISTRIBUTED ANTENNAS

TECHNICAL FIELD

The present invention relates generally to communications and particularly to gain control of signals in a distributed antenna system.

BACKGROUND

Various types of wireless communication systems have become prevalent around the world. For example, cellular communication systems cover most major metropolitan areas as well as major highways through remote areas. Cellular systems permit individuals with cellular handsets to communicate with base stations that are connected to the public switched telephone network (PSTN) or some other communication network.

As with any communication system, cellular systems can leave coverage "holes" where the signal from the base stations cannot reach. The holes can be in tunnels, valleys, city streets between tall buildings, or any other location where a radio frequency (RF) signal is blocked.

Placing additional base stations where these coverage holes are located is not always an option. Base stations tend to be very expensive due not only to the cost of the equipment but also because of land acquisition costs. Additionally, large base station antennas may not fit within an area either physically or aesthetically.

One solution to hole coverage is to use smaller distributed antennas where coverage is needed but a base station is not warranted or desired. There are problems, however, with using a distributed antenna system.

Any system has a certain dynamic range over which signals are processed. For a system that has only one antenna port, the entire dynamic range is available to the single port signal. When the system has multiple antenna ports, as in the distributed antenna system, the same dynamic range is shared amongst the aggregate signal from all the ports. This reduces the dynamic range available for each port when multiple ports are simultaneously active. One problem with distributed antennas on a single signal path is that the aggregate signal along the signal path may exceed the system's allowable dynamic range. There is a resulting need in the art for a distributed antenna system with gain control.

SUMMARY

The embodiments of the present invention encompass a communication system that has a plurality of distributed antenna ports. Each port is capable of receiving a communication signal having a signal level. A communication medium couples the plurality of distributed antenna ports. An attenuation function is coupled to the plurality of antenna ports. The attenuation function is capable of attenuating at least one signal level in response to attenuation instructions. A gain control function is coupled to the attenuation function. The gain control function generates the attenuation instructions in response to a sample of the signal level.

DETAILED DESCRIPTION

By distributing signal attenuation and control of the attenuation, the embodiments of the present invention retain the original system dynamic range. By doing so, no additional bits are needed to represent the aggregate signal from the distributed antennas.

The embodiments of the present invention refer to fiber optics as a communications medium between remote units and the host unit. However, the communications medium connecting the remote units to the host unit can take any form including a laser through an air interface, an RF signal over coaxial cable, or an RF signal through an air interface.

Figure 1:
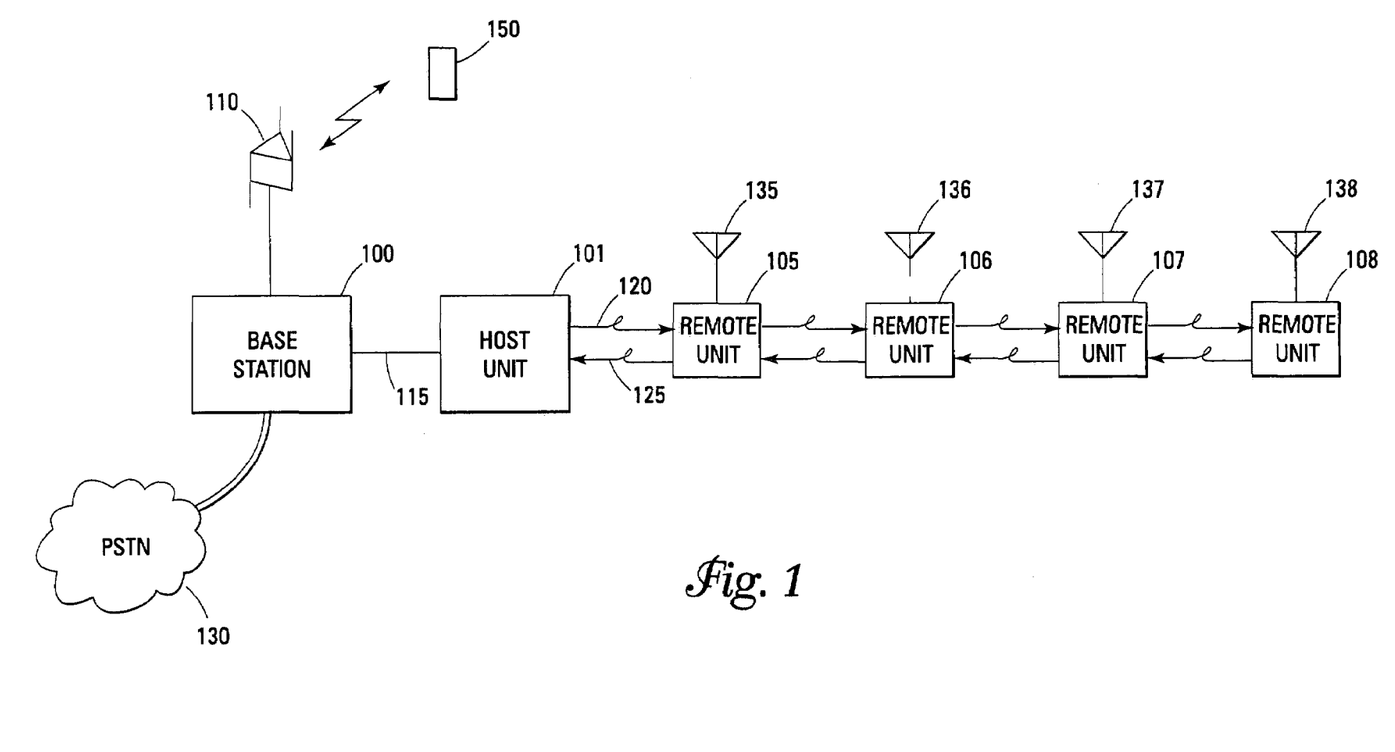
FIG. 1 shows a block diagram of one embodiment of a distributed digital antenna system of the present invention.

FIG. 1 illustrates a block diagram of one embodiment of a distributed digital antenna system of the present invention. The system has a base station (100) that communicates over an RF link using an antenna (110). The base station communicates over the RF link using any appropriate air interface standard. For example, the air interface standard comprises one of Advanced Mobile Phone System (AMPS), code division multiple access (CDMA), time division multiple access (TDMA) Global System for Mobile communications (GSM), or any other appropriate air interface standard.

The RF link is made up of a forward link over which the base station (100) transmits to a subscriber unit (150). The subscriber unit (150) transmits back to the base station (100) over a reverse link. The subscriber unit (150) is either a mobile station or a fixed station such as in a wireless local loop system.

The base station (100) has the transmitters and receivers that enable the subscriber unit (150) to communicate with the public switched telephone network (PSTN) (130). In one embodiment, the base station links the subscriber unit (150) to other subscriber units that are communicating with other base stations. In one embodiment, the base station (100) is connected to the PSTN through a mobile switching center that handles the switching of calls with multiple base stations.

A host unit (101) is connected to the base station (100) through an RF link (115). In one embodiment, this link (115) is a coaxial cable. Other embodiments use other types of connections such as an air interface or an optical fiber carrying digital RF signals. U.S. patent application Ser. No.

09/619,431, assigned to ADC Telecommunications, Inc. and incorporated herein by reference, discloses digital RF signals.

The host unit (101) is responsible for converting the RF signal from the base station (100) to an optical signal for transmission over an optical medium. The host unit (101) also converts a received optical signal to an RF signal for transmission to the base station (100). In other embodiments, the host unit (101) performs additional functions.

One or more remote units (105–108) are connected to the host unit (101) through an optical medium, such as fiber optic lines (120 and 125), in a daisy-chain arrangement. The remote units (105–108) are placed in locations that require additional signal coverage due to a lack of coverage by the base station (100). The remote units (105–108) communicate with subscriber units in a particular remote unit's coverage area over an RF link provided by the remote unit antennas (135–138).

For purposes of illustration, four remote units (105–108) are shown. However, alternate embodiments use other quantities of remote units. If only a small geographic area requires coverage, as few as one remote unit (105) is used. If a highway in a remote area requires additional coverage, more than four remote units are typically used.

The embodiment of FIG. 1 uses a separate fiber optic line for each direction of communication. Each fiber carries a different wavelength. For example, the fiber optic line (120) from the host unit (101) to the remote units (105–108) carries a wavelength of $\lambda_1$. The fiber optic line (125) from the remote units (105–108) to the host unit (101) carries a wavelength of $\lambda_2$. In alternate embodiments, each fiber carries the same wavelength.

The fiber optic line (120) from the host unit (101) to the remote units (105–108) carries the digital optical signal for transmission by the remote units (105–108). The fiber optic line (125) from the remote units (105–108) carries a digital optical signal comprising the sum of the received signals from each of the remote units (105–108). The generation of this summation signal from the remote units is discussed subsequently.

Figure 2:
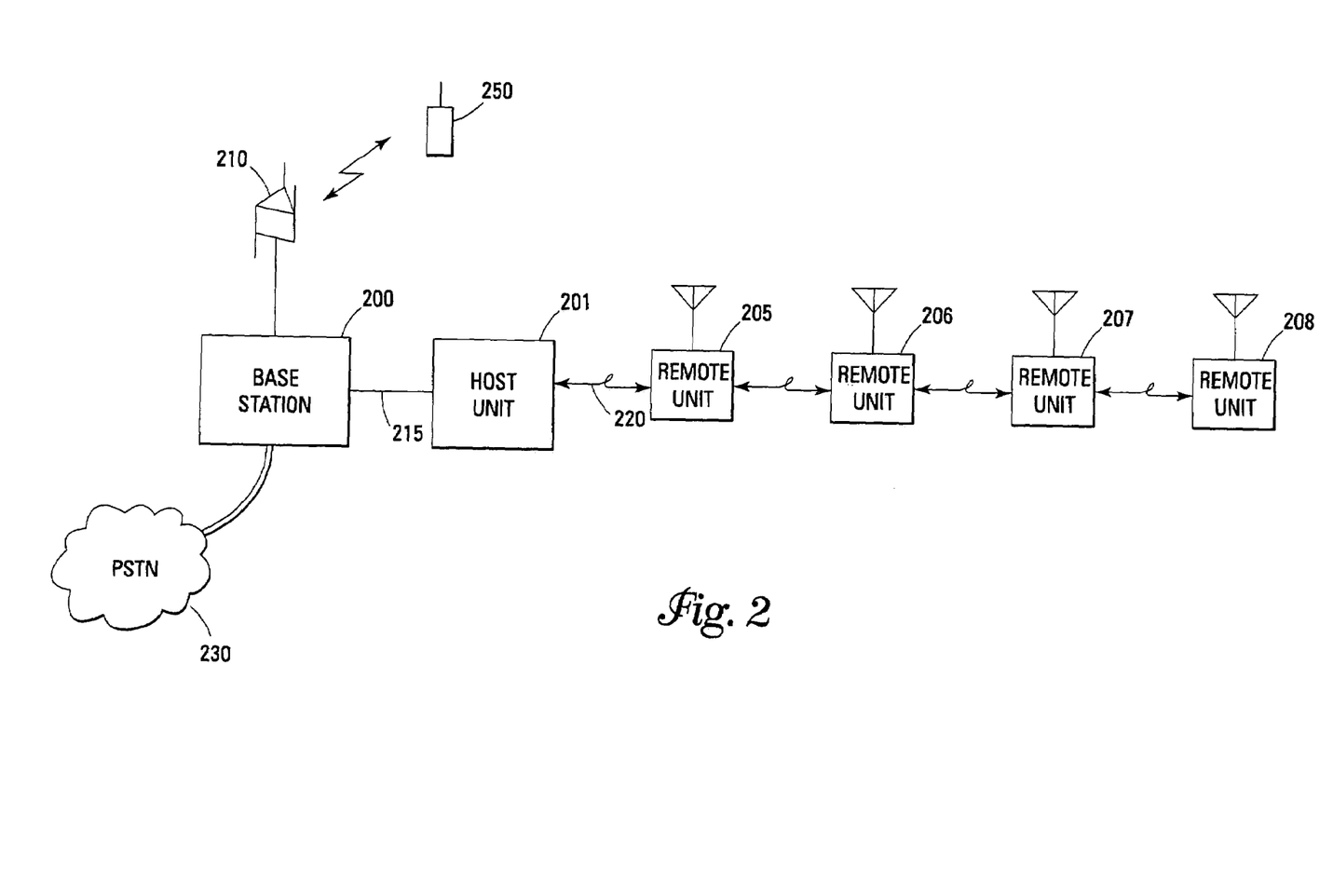
FIG. 2 shows a block diagram of another embodiment of a distributed digital antenna system of the present invention.

FIG. 2 illustrates a block diagram of another embodiment of a distributed digital antenna system of the present invention. This system is similar to the embodiment of FIG. 1 except that the remote units (205–208) are connected to the host unit (201) over a single optical medium (220).

The system of FIG. 2 has a base station (200) that communicates over an RF link using an antenna (210). The base station can communicate over the RF link using any air interface standard. For example, the air interface standard may be code division multiple access (CDMA), time division multiple access (TDMA), or Global System for Mobile communications (GSM).

The RF link is made up of a forward link over which the base station (200) transmits to a subscriber unit (250). The subscriber unit (250) transmits back to the base station (200) over a reverse link. The subscriber unit (250) may be a mobile station or a fixed station such as in a wireless local loop system.

The base station (200) has the transmitters and receivers that enable the subscriber unit (250) to communicate with the public switched telephone network (PSTN) (230). The base station may also link the subscriber unit (250) to other subscriber units that are communicating with other base stations. In one embodiment, the base station (200) is connected to the PSTN through a mobile switching center that handles the switching of calls with multiple base stations.

A host unit (201) is connected to the base station (200) through an RF link (215). In one embodiment, this link (215) is a coaxial cable. Other embodiments use other types of connections such as an air interface or an optical fiber carrying digital RF signals.

The host unit (201) is responsible for converting the RF signal from the base station (200) to a digital optical signal for transmission over an optical medium. The host unit (201) also converts a received optical signal to an RF signal for transmission to the base station (200). In other embodiments, the host unit (201) performs additional functions.

One or more remote units (205–208) are connected to the host unit (201) through an optical medium, such as a fiber optic line (220), that is connected in a daisy-chain arrangement. The remote units (205–208) are placed in locations that require additional signal coverage due to a lack of coverage by the base station (200).

For purposes of illustration, four remote units (205–208) are shown. However, alternate embodiments use other quantities of remote units depending on the application.

The embodiment of FIG. 2 uses a single fiber optic line (220) for communication both to and from the remote units (205–208). This is accomplished by the single fiber (220) carrying multiple wavelengths. For example, the fiber optic line (220) uses a wavelength of $\lambda_1$ for the digital signal from the host unit to the remote units (205–208). The fiber optic line (220) also carries a digital summation signal with a wavelength of $\lambda_2$. This digital summation signal is the sum of the received signals from the remote units (205–208). The generation of this summation signal from the remote units is discussed subsequently.

Figure 3:
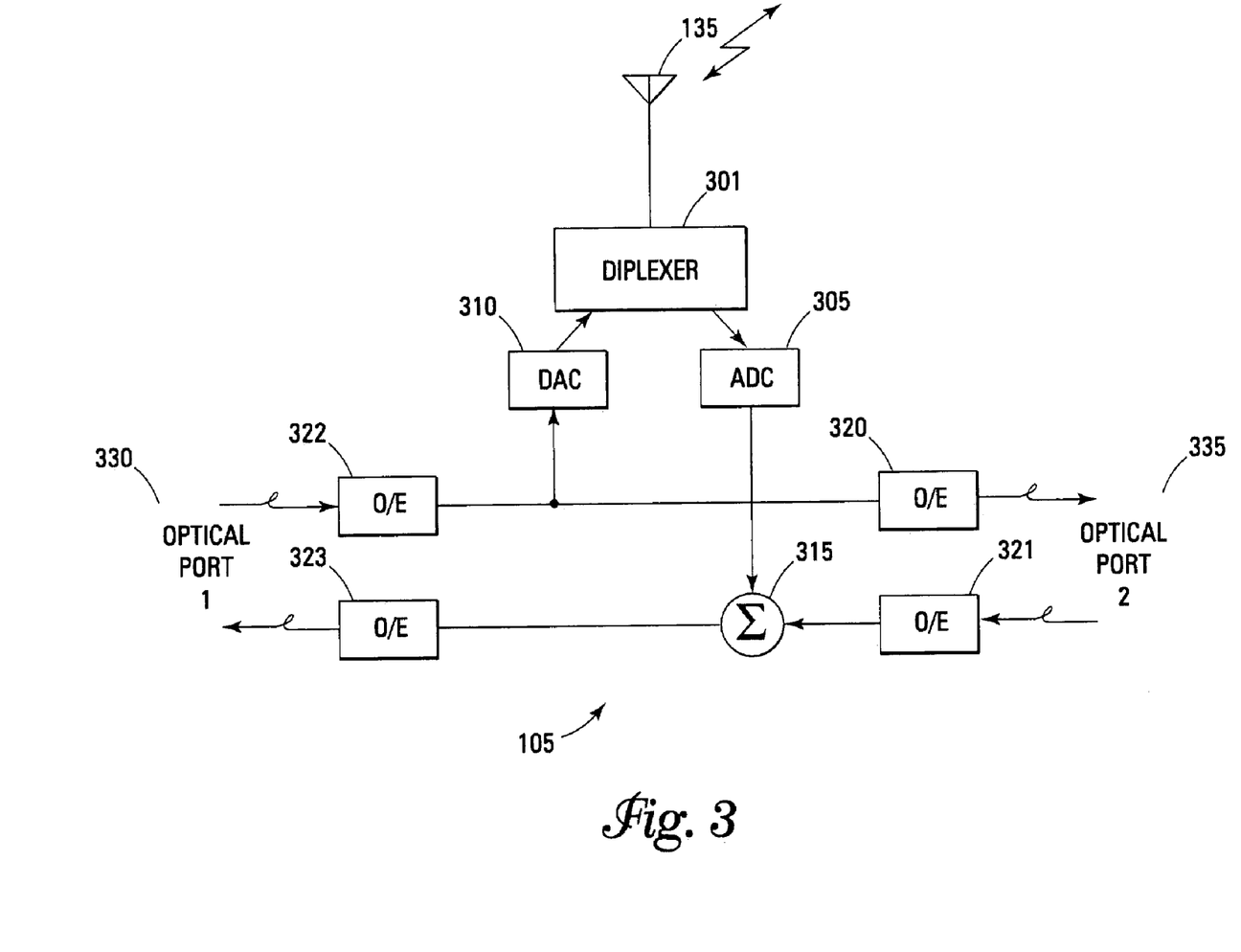
FIG. 3 shows a block diagram of one embodiment of a remote unit in accordance with the system of FIG. 1.

FIG. 3 illustrates a block diagram of one embodiment of a remote unit (105) of FIG. 1. Each of the remote units (105–108) of the embodiment of FIG. 1 are substantially identical in functional composition.

The remote unit (105) transmits and receives RF communication signals over the antenna (135). Both the receive and transmit circuitry is connected to the antenna (135) through a diplexer (301). Alternate embodiments use other quantities of antennas. For example, one embodiment uses three antennas to cover three different sectors of an area.

An analog signal that is received on the antenna (135) is split off by the diplexer (301) to an analog-to-digital converter (305). The analog-to-digital converter (305) digitizes the received analog signal by periodically sampling the signal. The sampling generates a digital representation of the received analog signal.

The digitized received signal is input to a summer (315) to be added to the digitized signals from the preceding remote units in the daisy-chain. The input of the summer (315), therefore, is coupled to an output of a previous remote unit. The output of the summer (315) is a summation signal that is coupled to either the input of a subsequent remote unit or to the host unit. The host unit thus receives a summation signal that represents the sum of all the signals received by the remote units (105–108) of the system.

A digital signal from the host unit is coupled to a digital-to-analog converter (310). The digital-to-analog converter (310) takes the digital representation of an analog signal and converts it to the analog signal for transmission by the antenna (135).

Optical-to-Electrical converters (320–323) are located at the optical ports (330 and 335) of the remote unit (105). Each optical port (330 and 335) has an input and an output that are each coupled to an Optical-to-Electrical converter (320–323).

Since the remote unit (105) operates with electrical signals that are represented by the optical signals coming in through the optical ports (330 and 335), the Optical-to-Electrical converters (320–323) are responsible for converting the optical signals to electrical signals for processing by the remote unit (105). Received electrical signals are converted from electrical to an optical representation for transmission over the optical fiber.

Figure 4:
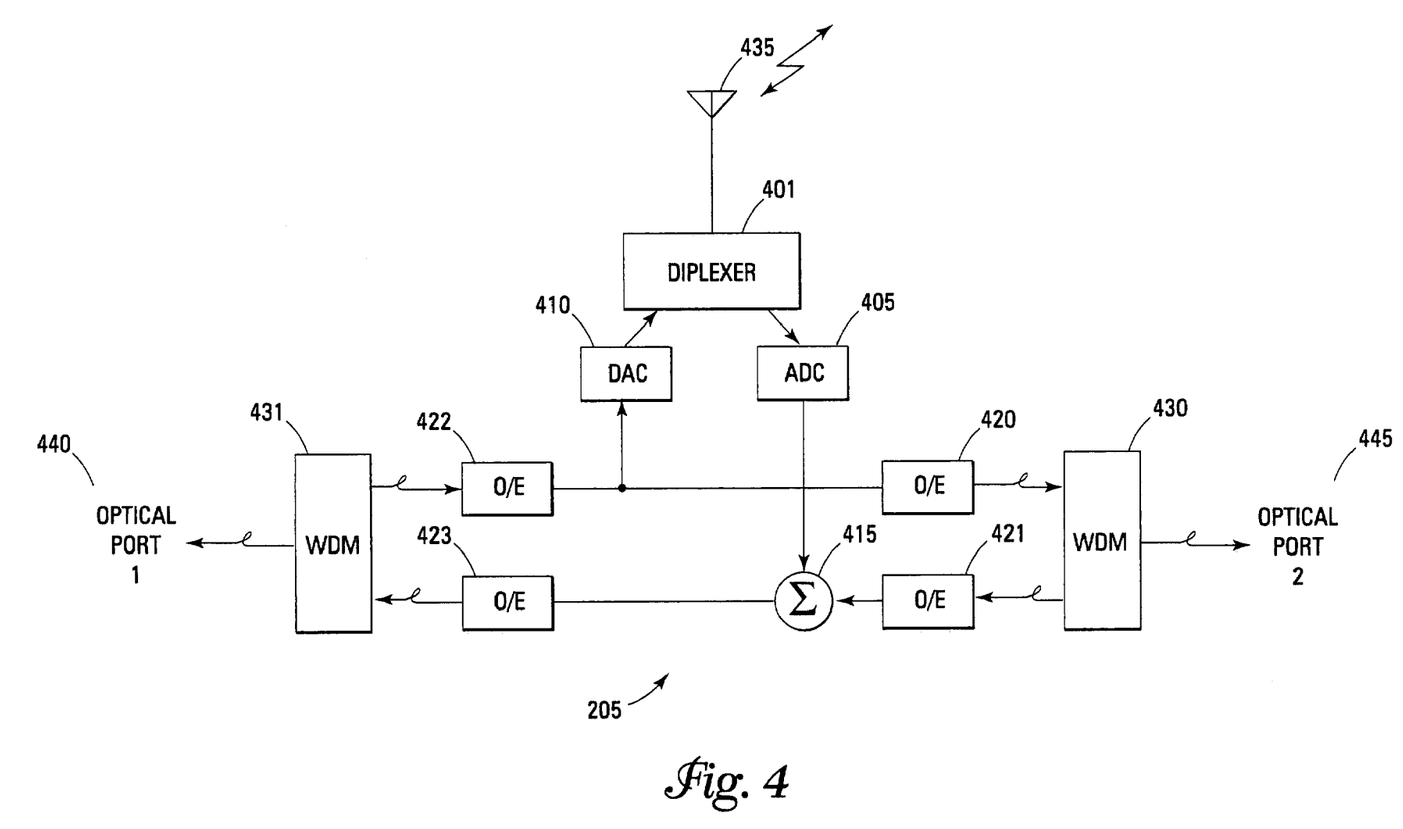
FIG. 4 shows a block diagram of one embodiment of a remote unit in accordance with the system of FIG. 2.

FIG. 4 illustrates a block diagram of one embodiment of a remote unit (205) of FIG. 2. Each of the remote units (205–208) of the embodiment of FIG. 1 is substantially identical in functional composition.

The remote unit (205) transmits and receives RF communication signals over the antenna (435). Both the receive and transmit circuitry are connected to the antenna (435) through a diplexer (401). Alternate embodiments use other quantities of antennas. For example, one embodiment uses three antennas to cover three different sectors of an area.

An analog signal that is received on the antenna (435) is split off by the diplexer (401) to an analog-to-digital converter (405). The analog-to-digital converter (405) digitizes the received analog signal by periodically sampling the signal. The sampling generates a digital representation of the received analog signal.

The digitized received signal is input to a summer (415) to be added to the digitized signals from the preceding remote units in the daisy-chain. The host unit thus receives a summation signal that represents the sum of all the signals received by the remote units (205–208) of the system.

A digital signal from the host unit is coupled to a digital-to-analog converter (410). The digital-to-analog converter (410) takes the digital representation of an analog signal and converts it to the analog signal for transmission by the antenna (435).

Optical-to-Electrical converters (420–423) are located at the optical ports (440 and 445) of the remote unit (205). Each optical port (440 and 445) has an input and an output that are each coupled to an Optical-to-Electrical converter (420–423).

Since the remote unit (205) operates with electrical signals that are represented by the optical signals coming in through the optical ports (440 and 435), the Optical-to-Electrical converters (420–423) are responsible for converting the optical signals to electrical signals for processing by the remote unit (205). Received electrical signals are converted from electrical to an optical representation for transmission over the optical fiber.

A wavelength division multiplexer (WDM) (430 and 431) is located at each optical port (440 and 445). The WDMs (430 and 431) perform the optical multiplexing necessary to combine several optical signals having several wavelengths. The WDMs (430 and 431) also perform the optical demultiplexing necessary to split the multiple wavelengths of a single fiber to their own signal paths.

In the above-described embodiments, if one antenna port uses up all of the system's dynamic range, none is available for the other antenna ports and the aggregate dynamic range needs to be increased. The amount of additional dynamic range required (in dB) is expressed as $6*\text{Log}_2 N$, where N is the number of antenna ports. The quantity of additional bits required in a frame in order to express the aggregate signal is expressed as $\text{Log}_2 N$.

As an example of one embodiment of operation, the dynamic range for one antenna port is 14 bits at 84 dB. To accommodate the aggregate dynamic range for 32 antenna ports, an additional 30 dB and 5 bits are required. In this case, the analog-to-digital resolution for each port still remains at 14 bits but the summation of all the antenna port signals is represented by 19 bits.

In order to keep the original dynamic range and output signal levels, the distributed attenuation of the embodiments of the present invention use attenuators at antenna port inputs, outputs, or both. The distributed control may use a head-end based controller with feedback to each antenna port, local controllers at each antenna port, or distributed control with distributed feedback.

The various embodiments of the present invention use automatic gain limiting (AGL) as a gain control function. Alternate embodiments use automatic gain control (AGC) as a gain control function. AGL is active only when the signal exceeds some maximum value. AGC continuously controls attenuation.

The embodiments of the present invention employ different methods of attenuation. These methods include continuous attenuation and stepped attenuation.

Continuous attenuation is continuous in value. The value specifies exactly as much attenuation as is needed. In other words, the attenuation could be proportional to the excess sampled signal level above a maximum threshold. If the aggregate signal is 2.3 dB above the maximum threshold, the attenuator introduces exactly 2.3 dB of attenuation.

This method of attenuation is accomplished by multiplying the aggregate value by the appropriate attenuation factor. In one embodiment, the attenuation factor is between 0, for infinite attenuation, and 1 for no attenuation. Other embodiments may use other number ranges to represent the attenuation factor.

Stepped attenuation uses a limited set of numbers to provide attenuation in discrete increments. The set of numbers represents a corresponding set of attenuation factors. In one embodiment, the numbers 0 through 5 represents attenuation factors from 0 to 30 dB in 6 dB increments. Other embodiments may use other numbers to represent other ranges. Above a maximum threshold, 6 dB of attenuation is applied. Every additional 6 dB above the threshold another 6 dB of attenuation is applied.

The 6 dB increments can be accomplished in a binary number by bit shifting in the direction of a smaller value. One shift equals 6 dB, two shifts equals 12 dB, and three shifts equals 18 dB. This can be continued for as much attenuation as required. For 32 antenna ports, five shifts of 6 dB accommodate 30 dB of attenuation.

The embodiments of the present invention use automatic gain limiting based on various methods of sensing levels and applying attenuation. These methods include gain limiting based on the sensing of input signal levels, the sensing of common output signal levels, the sensing of feedback signal levels, or various combinations of these. In addition, these methods include applying attenuation to the input signals, to the common (aggregate) output signals, or both.

The following embodiments discuss certain transport path and aggregate signal levels (e.g., 14 bits). This is for illustration purposes only. The present invention is not limited to any one transport path size or aggregate signal level.

Figure 5:
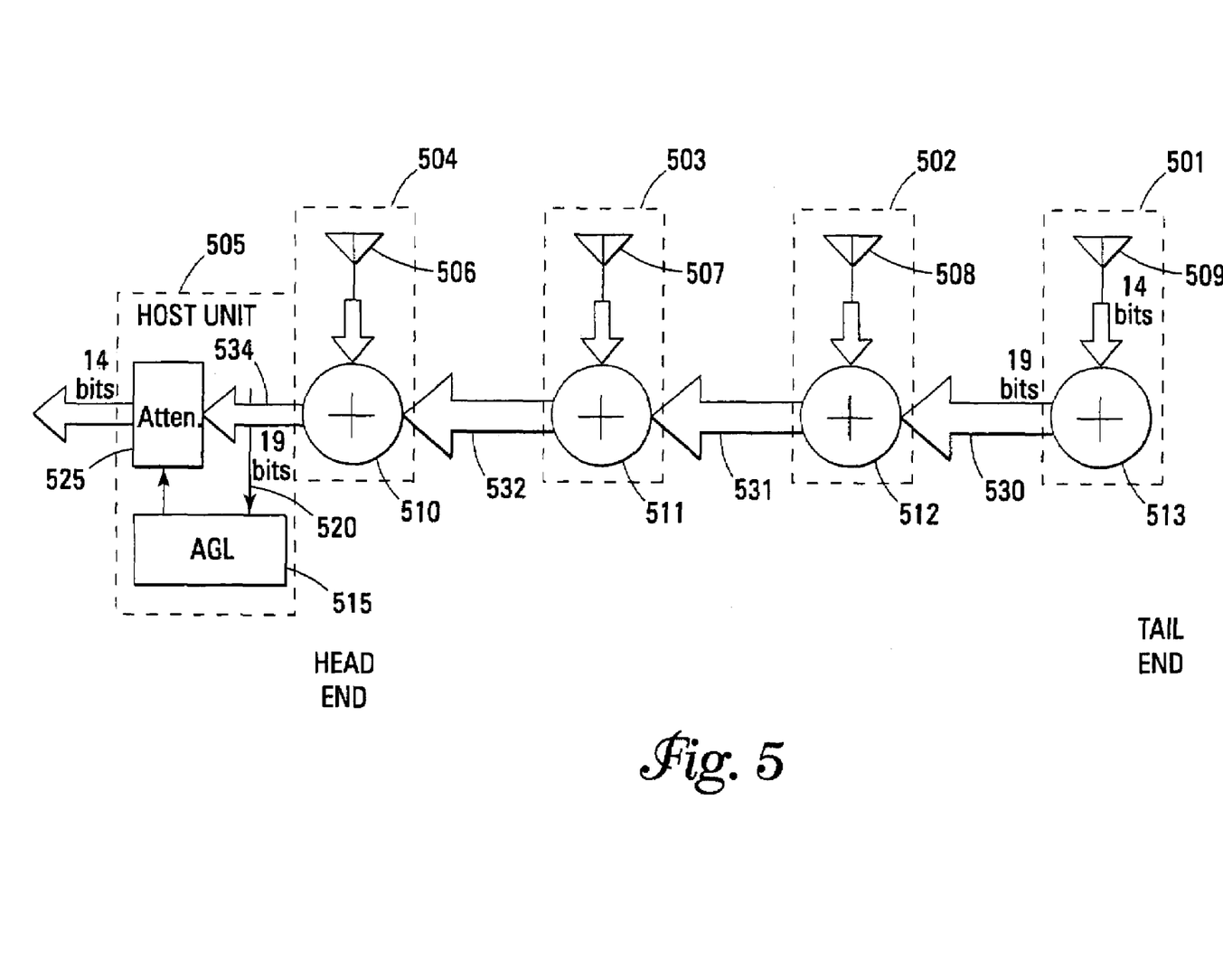
FIG. 5 shows a block diagram of one embodiment of a system having distributed summation and gain control with head end common aggregate attenuation.

FIG. 5 illustrates a block diagram of one embodiment of a system having distributed summation and gain control with head end common attenuation. For purposes of clarity, a functional equivalent of the above-described remote unit, in this and subsequent embodiments, is illustrated as an antenna (509) with a summation symbol (513).

The embodiment of FIG. 5 includes the four remote units (501–504) and the host unit (505) as described previously. Each remote unit (501–504) has an antenna (506–509) that receives RF signals that are digitized and summed (510–513) with any previous remote unit signals.

The summations (510–513) and transport path (530–532) to each remote unit should have sufficient dynamic range to deliver the aggregate dynamic range. For example, in one embodiment the full dynamic range is 19 bits for 32 antenna ports. This embodiment assumes that all of the remote units are substantially identical.

In the embodiment of FIG. 5, the host unit (505), located at the head end, performs the AGL (515) and attenuation (525) functions. The AGL function (515) samples (520) the aggregate signal (534) from the last remote unit (504) before the host unit (505). This signal requires 19 bits for a dynamic range of 114 dB. Other embodiments have other bit quantities to represent other dynamic ranges.

If the AOL function (515) determines that the aggregate signal (534) is greater than the maximum allowable dynamic range, the AOL function (515) instructs the attenuation function (525) to attenuate the common signal. The attenuation function (525) may be stepped or continuous. The AOL function is based on sensing the common output signal level and attenuating the common output signal level.

In the example illustrated in FIG. 5 where the aggregate signal is 19 bits, the attenuation function attenuates the signal to 14 bits. Thus, the signal from the host unit (505) to a base station will be within the allowable dynamic range.

Figure 6:
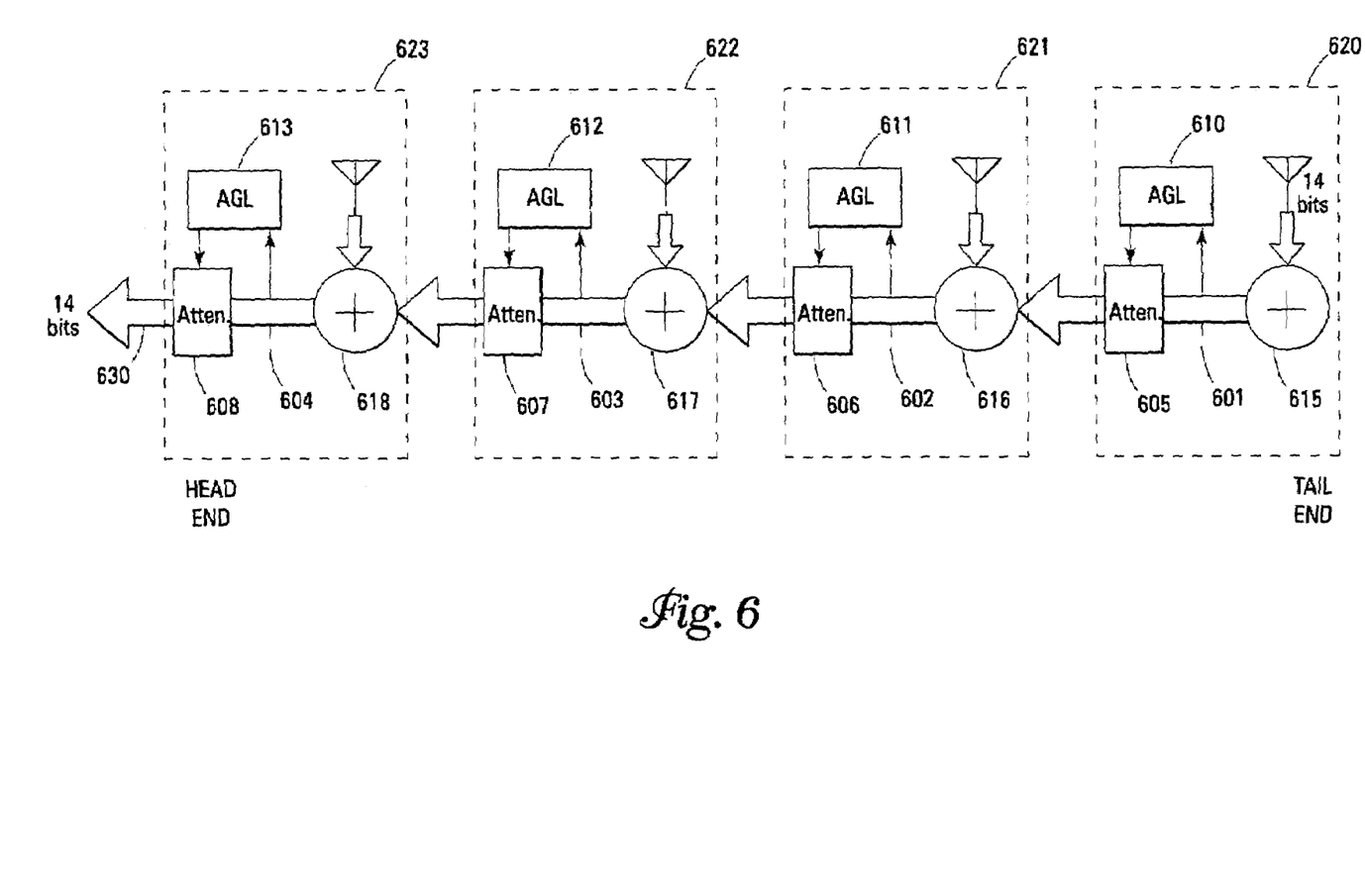
FIG. 6 shows a block diagram of one embodiment of a system having distributed summation and gain control with localized common attenuation.

FIG. 6 illustrates a block diagram of one embodiment of a system having distributed summation and gain control with localized common attenuation. This embodiment uses a standard transport path (601–604) (e.g., 14 bits) by applying localized attenuation to its aggregate signal.

Each remote unit (620–623) attenuates its common output level so that the maximum level is not exceeded. The aggregate of all summations (615–618) and attenuations (605–608) results in a head end aggregate signal (630) that does not exceed the maximum level.

The AGL function (610–613) of each remote unit (620–623) samples the common signal level output (601–604) from the respective summation (615–618). If the signal level is greater than the allowable dynamic range, the AGL function (610–613) instructs its respective output attenuation function (605–608) to attenuate that particular common signal output.

Figure 7:
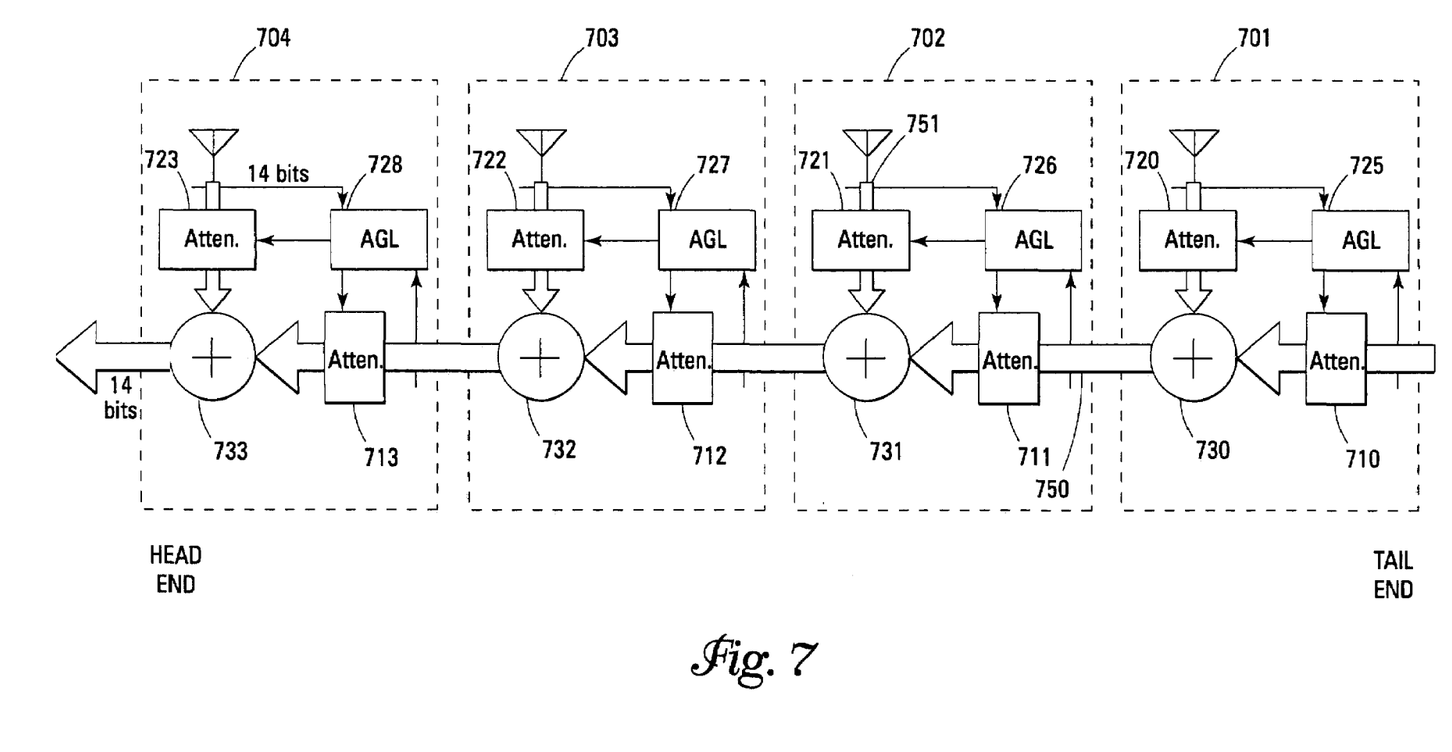
FIG. 7 shows a block diagram of one embodiment of a system having distributed summation and gain control with localized input attenuation.

FIG. 7 illustrates a block diagram of one embodiment of a system having distributed summation and gain control with localized input attenuation. In this embodiment, each of the remote units (701–704) uses an AGL function (725–728) to control attenuation functions (710–713 and 720–723) on the summation (730–733) inputs.

The input signals that are attenuated in this embodiment include both the antenna port and the downstream port. For example, in one remote unit (702) the AGL function (726) samples the downstream signal path input (750) and the antenna port input (751). If the dynamic range of either input is greater than the allowable maximum, the AGL function (726) instructs the downstream attenuation function (711), the antenna attenuation function (721), or both to attenuate the corresponding input signal.

Figure 8:
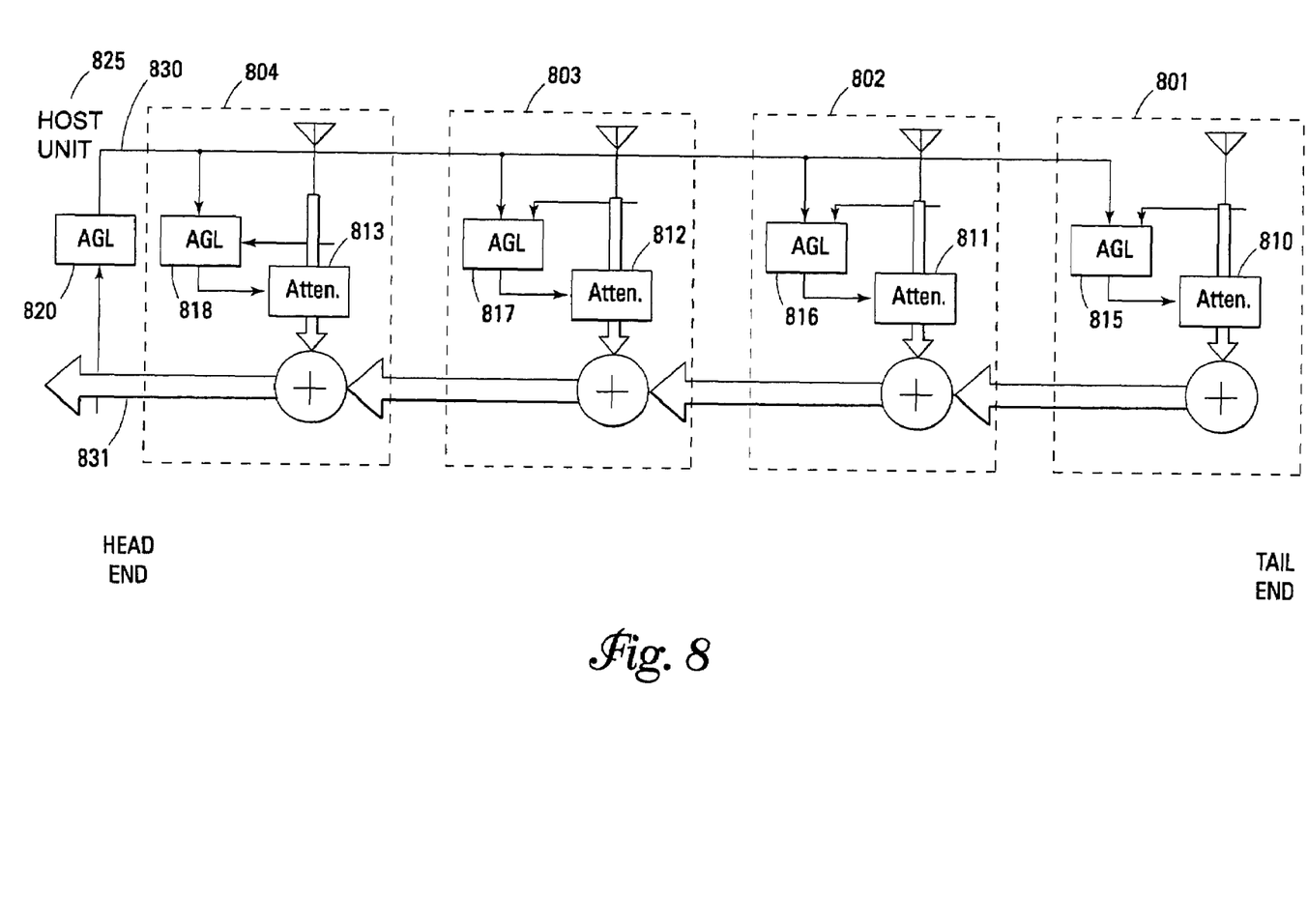
FIG. 8 shows a block diagram of one embodiment of a system having distributed summation and gain control with head end generated feedback control.

FIG. 8 illustrates a block diagram of one embodiment of a system having distributed summation and gain control with head end common attenuation. This embodiment uses an AGL function (820) at the host unit (825) to provide feedback (830) to the remote units (801–804).

Each remote unit (801–804) has an input attenuation function (810–813) at the antenna port to provide attenuation. An AOL function (815–818) samples the antenna port's received signal level. This level along with the feedback information from the head end AGL (820) is used to determine individual attenuation instructions to the input attenuation functions (810–813).

The embodiment of FIG. 8 additionally uses an AGL function (820) at the host unit (825) to sample the final aggregate signal (831). The host unit's AGL function (820) provides a head end feedback attenuation signal (830) to all of the remote units' AGL functions (815–818) to use in conjunction with the sampled input communication signal levels. One embodiment of this feedback signal (830) uses one or more bits in the data being transmitted along the optical medium to the remote units (801–804) from the host unit (825). Another embodiment uses a single bit as a communications channel to provide the feedback information.

For the case of continuous attenuation, the feedback attenuation signal (830) is a head end continuous attenuation factor. In one embodiment this factor is comprised of a value between 0 and 1. The localized AGL (815–818) uses this factor in addition to the local input signal level to determine what attenuation, if any, to apply locally. In one embodiment the continuous attenuation is accomplished by multiplication.

For the case of stepped attenuation, the feedback attenuation signal (830) is a head end stepped attenuation factor. In one embodiment this factor is comprised of an integer value between 0 and 5. The localized AGL (815–818) uses this factor in addition to the local input signal level to determine what stepped attenuation, if any, to apply locally. In one embodiment the stepped attenuation is accomplished by bit shifting.

Since some of the signals may not be attenuated, the resulting aggregate signal may still be slightly too high. In this case, the AGL function (820) at the host unit (825) adjusts its feedback attenuation factor to whatever value is needed (e.g., 0.4 in a continuous feedback system ranging from 0 to 1). This value is dynamic and is lowered until the desired aggregate signal level is achieved.

Using the continuous attenuation method, the host unit's AGL function (820) samples the final aggregate signal (831) from the remote unit (804) nearest the head end. If the level of the final aggregate signal (831) is too large, the host unit (825) provides a feedback attenuation factor that starts at one and slews down toward zero. When the final aggregate signal level is within bounds (i.e., less than the maximum dynamic range), the host unit holds this attenuation factor.

If the final aggregate signal level later decreases sufficiently, the host unit (825) slowly raises the attenuation factor back toward one. All of the remote units (801–804) apply attenuation only to their own ports. This applied attenuation depends on the respective antenna port's input level as well as the feedback factor (830).

Using the stepped attenuation method, the host unit (825) samples the final aggregate signal (831) from the remote unit (804) nearest the head end. If the final aggregate signal (831) is too large, the host unit (825) provides a feedback number. In one embodiment, this is a number that starts at 0 (no attenuation) and increments towards 5 (maximum attenuation). This embodiment assumes 6 dB per step and accommodates 30 db attenuation. Other embodiments use other increments and other ranges.

When the final aggregate signal level is less than or equal to 0 dB (unity gain), the host unit's AGL function (820) holds this feedback number. If the final aggregate signal level decreases to a predetermined level (e.g., −12 dB), the host unit decrements the feedback number back towards 0. The decrementing occurs after a delay due to system end-to-end response.

Figure 9:
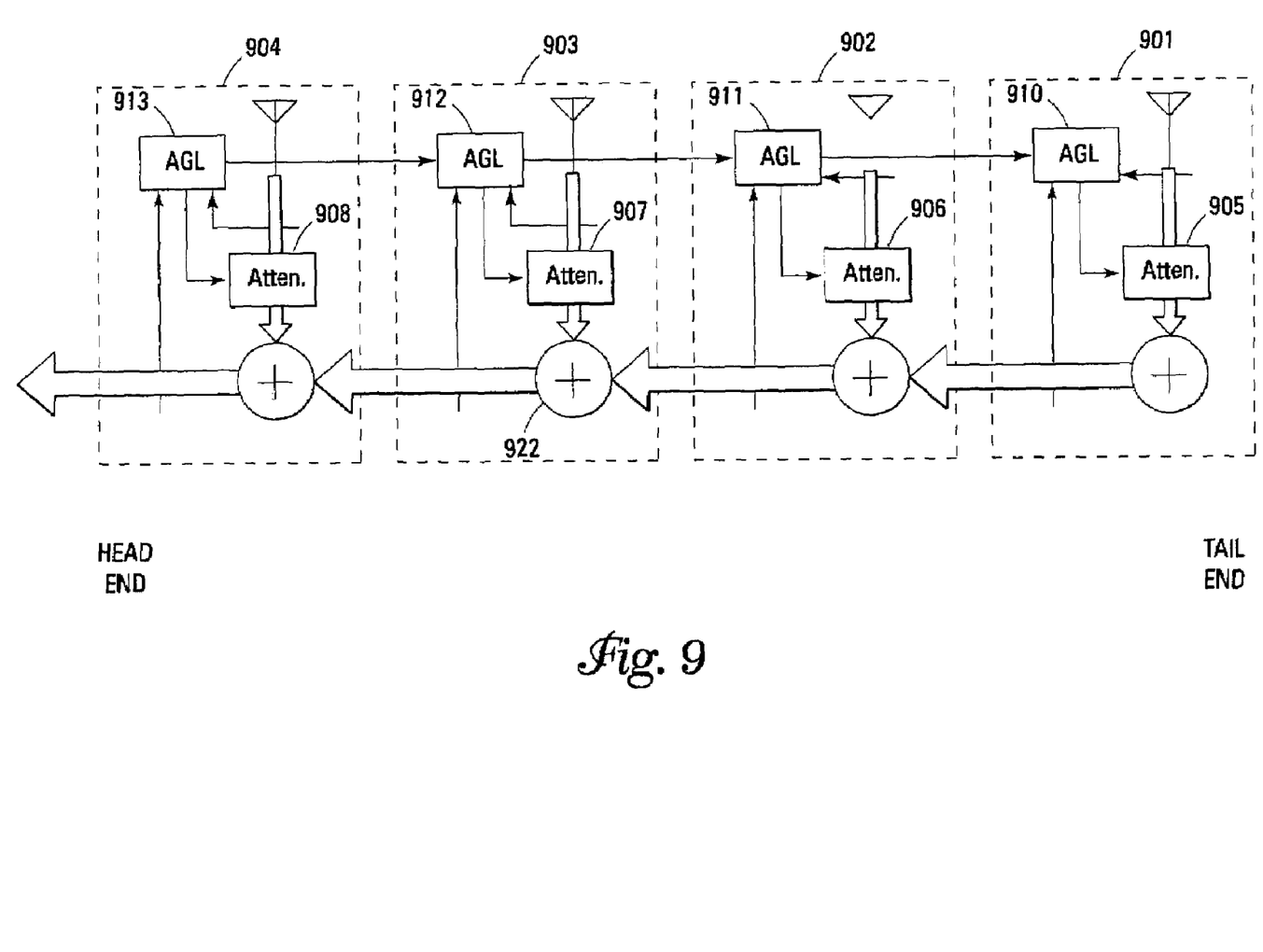
FIG. 9 shows a block diagram of one embodiment of a system having distributed summation and gain control with distributed feedback control.

FIG. 9 illustrates a block diagram of one embodiment of a system having distributed summation, distributed attenuation, and distributed attenuation control. In this embodiment each remote unit (901–904) re-computes the AGL feedback factor for downstream units.

In this embodiment, every unit (901–904) is functionally identical with the same AGL function (910–913). The AGL function has both an input feedback factor (from the direction of the head end), a signal from the sampled antenna input, and an input from the common output. At the head end unit (904), the input feedback is unconnected.

Each AGL function (910–913) has two outputs. One output is used to control the attenuation (905–908) of the antenna signal input. The other output is used to provide an output feedback factor in the direction of the tail end. At the tail end (901) the output feedback is unconnected.

The AGL function (910–913) determines a factor related to the common input signal. The output feedback factor is based on both this common factor and the input feedback factor. In one embodiment, the most severe factor is used.

The AGL function (910–913) also determines amount of input attenuation (905–908) to the antenna signal. This attenuation is based on the input feedback factor, the input antenna signal level, and the common input signal level.

In this embodiment, the host unit generates the highest attenuation factor because its aggregate signal is the largest. Because of the feedback, all units normally use this factor to apply attenuation. Since all of the remote units also sample their own antenna port, in one embodiment they will apply no attenuation or little attenuation to sufficiently small signals and apply large attenuation to large signals. That is, the gain is inversely proportional to the large signal level.

If there is a break in the feedback path, the aggregate sampling at each remote unit prevents any unit's aggregate signal from overflowing. Furthermore, all units from the tail end to the point of the break will perform fair sharing of the aggregate signals amongst themselves. Similarly, all units from the break to the head end will perform fair sharing of the aggregate signals amongst themselves. However, the tail end group is favored over the head end group.

Numerous modifications and variations of the present invention are possible in light of the above teachings. It is therefore to be understood that within the scope of the appended claims, the invention may be practiced otherwise than as specifically described herein.

What is claimed is:

1. A communication system comprising:
   a plurality of distributed antenna ports each capable of receiving a communication signal having a signal level;
   a plurality of converters each coupled to one of the distributed antenna ports, wherein each converter digitizes the received signal;
   a communication medium coupling the plurality of distributed antenna ports;
   an attenuation function coupled to the plurality of antenna ports, the attenuation function capable of attenuating at least one signal level in response to attenuation instructions; and
   a gain control function coupled to the attenuation function, the gain control function generating the attenuation instructions in response to a sample of the at least one signal level.

2. The system of claim 1 wherein the communication medium is an optical medium.

3. The system of claim 1 and further including a host unit that comprises the attenuation function and the gain control function.

4. The system of claim 1 wherein the plurality of distributed antenna ports are coupled to the communication medium through summation functions.

5. The system of claim 4 wherein the summation functions generate an aggregate signal from the plurality of distributed antenna ports, the aggregate signal representing a summation of the communication signals.

6. The system of claim 5 wherein a signal level of the aggregate signal is attenuated by the attenuation function.

7. The system of claim 1 wherein each of the plurality of distributed antenna ports has separate attenuation functions and gain control functions.

8. The system of claim 1 wherein the gain control function is an automatic gain limiting function.

9. A communication system comprising:
   a plurality of distributed antenna ports each capable of receiving a communication signal having a first signal level;
   a plurality of distributed summation functions, each summation function coupled to a distributed antenna port of the plurality of antenna ports and generating an aggregate signal, the plurality of distributed summation functions comprising a head end summation function that generates an aggregate signal having a second signal level;
   a communication medium coupling the plurality of summation functions;
   an attenuation function coupled to head end summation function, the attenuation function capable of attenuating the second signal level in response to attenuation instructions; and
   a gain control function coupled to the attenuation function, the gain control function generating the attenuation instructions in response to a sample of the second signal level.

10. The system of claim 9 wherein the communication medium is an optical medium and the plurality of distributed antenna parts are arranged along the optical medium in a daisy-chain fashion.

11. The system of claim 9 wherein the gain control function is an automatic gain limiting function.

12. A communication system comprising:
    a plurality of distributed antenna ports each capable of receiving a communication signal;
    a plurality of distributed summation functions, each summation function coupled to a distributed antenna port of the plurality of antenna ports and generating an aggregate signal, having an aggregate signal level, that represents a sum of the communication signal coupled to the summation function and any aggregate signal input to the summation function;
    a communication medium coupling the plurality of distributed summation functions;
    a plurality of distributed attenuation functions each coupled to a summation function such that the summation function's aggregate signal is attenuated in response to attenuation instructions; and
    a plurality of distributed gain control functions each coupled to a distributed attenuation function of the plurality of distributed attenuation functions, each distributed gain control function generating the attenuation instructions in response to a sample of the aggregate signal level.

13. The system of claim 12 wherein the attenuation instructions comprise an attenuation factor that is multiplied with the aggregate signal level.

14. The system of claim 12 wherein the attenuation instructions comprise an attenuation number that indicates a quantity of discrete attenuation increments.

15. A communication system comprising:
a plurality of distributed antenna ports each capable of receiving a communication signal;
a plurality of distributed summation functions, each summation function coupled to a distributed antenna port and generating an aggregate signal that represents a sum of the communication signal coupled to the summation function and any aggregate signal input to the summation function;
a communication medium coupling the plurality of distributed summation functions;
a plurality of first distributed attenuation functions each coupling an antenna port to its respective distributed summation function;
a plurality of second distributed attenuation functions each coupling an aggregate signal to an input of a distributed summation function; and
a plurality of distributed gain control functions each coupled to a first and a second distributed attenuation function, each distributed gain control function generating first attenuation instructions for the first distributed attenuation function in response to a sample of the communication signal and second attenuation instructions for the second distributed attenuation function in response to a sample of the aggregate signal.

16. The system of claim 15 wherein the first attenuation instruction comprises a first attenuation factor that is multiplied with the communication signal and the second attenuation instruction comprises a second attenuation factor that is multiplied with the aggregate signal.

17. The system of claim 15 wherein the first attenuation instruction comprises a first attenuation number that indicates a first quantity of discrete attenuation increments and the second attenuation instruction comprises a second attenuation number that indicates a quantity of discrete attenuation increments.

18. A communication system comprising:
a plurality of distributed antenna ports each capable of receiving a communication signal;
a plurality of distributed summation functions, each distributed summation function coupled to a distributed antenna port and generating an aggregate signal that represents a sum of the communication signal coupled to the distributed summation function and any aggregate signal input to the distributed summation function, a final distributed summation function generating a final aggregate signal from a daisy-chain summation of the aggregate signals;
a communication medium coupling the plurality of distributed summation functions;
a plurality of distributed attenuation functions each coupling an antenna port to its respective distributed summation function;
a plurality of distributed gain control functions each coupled to an attenuation function, each distributed gain control function generating attenuation instructions for the distributed attenuation function in response to a sample of the communication signal and a head end feedback signal; and
a head end gain control function coupled to each of the plurality of distributed gain control functions and generating the head end feedback signal in response to a sample of the final aggregate signal.

19. The system of claim 18 wherein the attenuation instructions comprise an attenuation factor that is multiplied with the aggregate signal level.

20. The system of claim 18 wherein the attenuation instructions comprise an attenuation number that indicates a quantity of discrete attenuation increments.

21. A communication system comprising:
a plurality of distributed antenna ports each capable of receiving a communication signal;
a plurality of distributed summation functions, each distributed summation function coupled to a distributed antenna port and generating an aggregate signal that represents a sum of the communication signal coupled to the distributed summation function and any aggregate signal input to the distributed summation function;
a communication medium coupling the plurality of distributed summation functions;
a plurality of distributed attenuation functions each coupling an antenna port to its respective distributed summation function; and
a plurality of distributed gain control functions each coupled to a distributed attenuation function, each distributed gain control function generating attenuation instructions for the distributed attenuation function in response to a sample of the communication signal and either a local attenuation signal based on the aggregate signal from its respective distributed summation function or a feedback attenuation signal from an upstream distributed gain control function.

22. The system of claim 21 wherein the upstream distributed gain control function feeds back in a downstream, direction the local attenuation signal if that was used in generating the attenuation instructions.

23. The system of claim 21 wherein the upstream distributed gain control function feeds back in a downstream direction the feedback attenuation signal if that was used in generating the attenuation instructions.

24. A method for distributed gain control of a distributed antenna system having a plurality of antenna ports, the method comprising:
summing a plurality of received signals in a distributed, daisy-chain fashion with any prior summed signals from a downstream antenna port of the plurality of antenna ports to generate a final aggregate signal;
sampling a signal level of the final aggregate signal; and
attenuating the final aggregate signal in response to the signal level.

25. The method of claim 24 wherein the attenuating is performed in response to an automatic gain limiting function that generates an attenuation factor that is multiplied with the final aggregate signal.

26. The method of claim 25 wherein the attenuation factor is in a range of zero to one.

27. The method of claim 24 wherein the attenuating is performed in response to an automatic gain limiting function that generates an attenuation number indicating a quantity of discrete attenuation increments to attenuate the final aggregate signal.

28. The method of claim 24 wherein the summing, sampling, and attenuating are accomplished in a digital fashion such that the final aggregate signal is a digital signal represented by a predetermined quantity of bits.

29. The method of claim 28 wherein attenuating the final aggregate signal reduces the predetermined quantity of bits necessary to represent the final aggregate signal.

30. A method for distributed gain control of a distributed antenna system having a plurality of antenna ports, the method comprising:
  summing a plurality of received signals in a distributed, daisy-chain fashion with a prior summed signal from a downstream antenna port of the plurality of antenna ports to generate a plurality of aggregate signals;
  sampling a signal level of each of the plurality of aggregate signals; and
  attenuating each aggregate signal in response to its signal level.

31. The method of claim 30 and further including generating gain control instructions for attenuating each aggregate signal.

32. The method of claim 31 wherein the gain control instructions are generated by an automatic gain limiting function that generates an attenuation number indicating a quantity of discrete attenuation increments to attenuate the final aggregate signal.

33. The method of claim 31 wherein the gain control instructions are generated by an automatic gain limiting function that generates an attenuation number indicating a quantity of discrete attenuation increments to attenuate the final aggregate signal.

34. A method for distributed gain control of a distributed antenna system having a plurality of antenna ports, the method comprising:
  summing a plurality of received signals in a distributed, daisy-chain fashion with a prior summed signal from a downstream antenna port of the plurality of antenna ports to generate a plurality of aggregate signals;
  sampling a first signal level of each of the prior summed signals;
  sampling a second signal level of each of the received signals; and
  attenuating each prior summed signal and each received signal in response to the first and second signal levels.

35. The method of claim 34 wherein the attenuating of the prior summed signal is performed in response to an automatic gain limiting function that generates an attenuation factor that is multiplied with the prior summed signal.

36. The method of claim 34 wherein the attenuating of the received signal is performed in response to an automatic gain limiting function that generates an attenuation factor that is multiplied with the received signal.

37. The method of claim 34 wherein the attenuating of the prior summed signal is only performed when the first signal level is greater than or equal to 1/N of a total system dynamic range, where N is a quantity of distributed antenna ports.

38. The method of claim 32 wherein the attenuating is performed in response to an automatic gain limiting function that generates an attenuation number indicating a quantity of discrete attenuation increments to attenuate the final aggregate signal.

39. The method of claim 34 wherein the attenuating of the prior summed signal is only performed when the second signal level is greater than or equal to 1/N of a total system dynamic range, where N is a quantity of distributed antenna ports.

40. A method for distributed gain control of a distributed antenna system having a plurality of antenna ports, the method comprising:
  summing a plurality of received signals in a distributed, daisy-chain fashion with a prior summed signal from a downstream antenna port of the plurality of antenna ports to generate a plurality of aggregate signals, one of the plurality of aggregate signals being a final aggregate signal;
  sampling a signal level of each received signal;
  sampling a signal level of the final aggregate signal to generate a feedback attenuation signal; and
  attenuating each received signal in response to its signal level and the feedback attenuation signal.

41. The method of claim 40 and further including:
  setting the feedback attenuation signal to one if the signal level of the final aggregate signal is greater than a distributed antenna system total dynamic range; and
  decreasing the feedback attenuation signal until the signal level of the final aggregate signal is less than the total dynamic range.

42. The method of claim 41 and further including:
  setting the feedback attenuation signal to a feedback attenuation number that starts at zero if the signal level of the final aggregate signal is greater than a distributed antenna system total dynamic range; and
  incrementing the feedback attenuation number until the signal level of the final aggregate signal is less than or equal to a first predetermined threshold; and
  decrementing the feedback attenuation number towards zero when the signal level of the final aggregate signal decreases to a second predetermined threshold.

43. The method of claim 42 wherein the first predetermined threshold is 0 dB and the second predetermined threshold is −12 dB.

44. A method for distributed gain control of a distributed antenna system having a plurality of antenna ports, the method comprising:
  summing a plurality of received signals in a distributed, daisy-chain fashion with a prior summed signal from a downstream antenna port of the plurality of antenna ports to generate a plurality of aggregate signals;
  sampling a signal level of each received signal;
  sampling a signal level of each aggregate signal;
  generating a local attenuation signal in response to the signal level of each aggregate signal; and
  attenuating each received signal in response to the signal level of its received signal and either the local attenuation signal or a feedback attenuation signal from an upstream direction.

45. The method of claim 44 and further including:
  transmitting in a tail end direction of the distributed antenna system the local attenuation signal if that was used in attenuating its respective received signal; and
  transmitting in the tail end direction the feedback attenuation signal if that was used in attenuating its respective received signal.

* * * * *